(12) United States Patent
Lam

(10) Patent No.: US 11,966,826 B2
(45) Date of Patent: *Apr. 23, 2024

(54) BIAS REDUCTION IN MACHINE LEARNING MODEL TRAINING AND INFERENCE

(71) Applicant: Epistamai LLC, Apex, NC (US)

(72) Inventor: Christopher Lam, Apex, NC (US)

(73) Assignee: Epistamai LLC, Apex, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/055,031

(22) Filed: Nov. 14, 2022

(65) Prior Publication Data

US 2023/0394358 A1    Dec. 7, 2023

Related U.S. Application Data

(63) Continuation of application No. 18/051,134, filed on Oct. 31, 2022.

(60) Provisional application No. 63/365,905, filed on Jun. 6, 2022.

(51) Int. Cl.
*G06N 20/00* (2019.01)

(52) U.S. Cl.
CPC .................... *G06N 20/00* (2019.01)

(58) Field of Classification Search
CPC ...................................... G06N 20/00
See application file for complete search history.

(56) References Cited

U.S. PATENT DOCUMENTS

| | | |
|---|---|---|
| 7,805,388 B2 | 9/2010 | Weston et al. |
| 10,984,283 B2 | 4/2021 | Aerni et al. |
| 11,249,982 B2 * | 2/2022 | Tormasov ........... G06F 16/2365 |
| 11,354,297 B2 * | 6/2022 | Bak ...................... G06F 16/2365 |
| 11,651,247 B2 * | 5/2023 | Golding ................... G06N 5/04 |
| | | 706/12 |

(Continued)

FOREIGN PATENT DOCUMENTS

WO    2023239506 A1    12/2023

OTHER PUBLICATIONS

Barocas, Solon et al.; Fairness and Machine Learning: Limitations and Opportunities; CEST 2022, 300 pages.

(Continued)

*Primary Examiner* — Casey R. Garner
(74) *Attorney, Agent, or Firm* — Polygon IP, LLP

(57) ABSTRACT

One or more default protected attribute values may be determined for a prediction model trained based on training data including a plurality of training observations. Each of the plurality of training observations may include a respective plurality of training data values corresponding with a plurality of features. Each of the plurality of training observations may also include a respective target value. Each of the plurality of training observations may include a respective protected attribute value corresponding with a protected attribute feature. A request to determine a designated predicted target value for a designated inference observation may be received after determining the one or more default protected attribute values. The predicted target value may be determined by applying the prediction model to an inference observation and a designated default protected attribute value of the one or more default protected attribute values.

19 Claims, 9 Drawing Sheets

(56) References Cited

U.S. PATENT DOCUMENTS

| | | | | |
|---|---|---|---|---|
| 11,682,074 | B2* | 6/2023 | Lyonnet | G06N 20/20 |
| | | | | 705/38 |
| 2015/0066593 | A1 | 3/2015 | Huang et al. | |
| 2019/0102693 | A1 | 4/2019 | Yates et al. | |
| 2020/0065710 | A1 | 2/2020 | Range et al. | |
| 2020/0311300 | A1 | 10/2020 | Callcut et al. | |
| 2020/0380309 | A1* | 12/2020 | Weider | G06F 18/2178 |
| 2021/0158102 | A1* | 5/2021 | Lohia | G06F 18/214 |
| 2021/0192280 | A1 | 6/2021 | Zhang et al. | |
| 2021/0334654 | A1* | 10/2021 | Himanshi | G06N 5/025 |
| 2022/0114399 | A1* | 4/2022 | Castiglione | G06V 10/751 |
| 2023/0394357 | A1 | 12/2023 | Lam | |
| 2023/0394366 | A1 | 12/2023 | Lam | |

OTHER PUBLICATIONS

Barocas, Solon; What is Proxy and Why Is it a Problem?, Mar. 2, 2022; Accessed on the internet at https://www.youtube.com/watch?v=bJBpzV-GTWQ.

Chiappa, Silvia et al.; A Causal Bayesian Networks Viewpoint on Fairness; arXiv:1907.06430v1 [stat.ML] Jul. 15, 2019, 19 pages.

Kusner, Matt et al.; Counterfactual Fairness; 31st Conference on Neural Information Processing Systems (NIPS 2017), 11 pages.

Metaxa, Danae et al., Using Algorithm Audits to Understand AI; HAI Policy Brief, Stanford University; Oct. 2022, 6 pages.

Netzer, Oded et al.; When Words Sweat: Identifying Signals for Loan Default in the Text of Loan Applications; Accessed at https://papers.ssrn.com/sol3/papers.cfm?abstract_id=2865327, Feb. 2019, 83 pages.

Nilforoshan, Hamed et al.; Causal Conceptions of Fairness and their Consequences; Proceedings of the 39th International Conference on Machine Learning, Baltimore Maryland; 2022, 40 pages.

Saleh, Kareem; Is it Time to Start Using Race and Gender to Combat Bias in Lending?; Accessed at https://www.forbes.com/sites/kareemsaleh/2022/08/10/is-it-time-to-start-using-race-and-gender-to-combat-bias-in-lending/?sh=165f9e731df7, Aug. 2022, 6 pages.

Zhang, Junzhe et al.; Fairness in Decision-Making—the Causal Explanation Formula; Association for the Advancement of Artificial Intelligence, 2018, 16 pages.

U.S. Appl. No. 18/309,190, Non Final Office Action dated Jul. 11, 2023, 34 pgs.

International Application Serial No. PCT/US23/21166, Written Opinion and Search Report dated Aug. 4, 2023, 11 pgs.

U.S. Appl. No. 18/309,190, Final Office Action dated Oct. 31, 2023, 33 pgs.

* cited by examiner

BIAS REDUCTION IN MACHINE LEARNING MODEL TRAINING AND INFERENCE

CROSS-REFERENCE TO RELATED APPLICATIONS

This application claims priority to U.S. patent application Ser. No. 18/051,134, by Christopher Lam, titled "BIAS REDUCTION IN MACHINE LEARNING MODEL TRAINING AND INFERENCE," filed Oct. 31, 2022, which claims priority to provisional U.S. Patent Application No. 63/365,905 by Christopher Lam, titled "BIAS REDUCTION IN MACHINE LEARNING MODEL TRAINING AND EXECUTION," filed Jun. 6, 2022, both of which are hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to machine learning and more specifically to bias reduction in machine learning.

BACKGROUND

Machine learning algorithms are applied to solve prediction problems in a variety of contexts. In a conventional machine learning approach, data is used to train a prediction model in a training phase. The trained prediction model may then be used to predict unobserved outcomes in an inference phase. A significant problem in machine learning is algorithmic bias, a topic that has recently received enormous attention, with high profile examples of discrimination in criminal justice, facial recognition, employment screening, and advertising.

Algorithmic bias refers to situations in which an algorithm is trained a way that biases the algorithm against individuals based on protected characteristics. For example, a class of people who have historically and/or currently faced discrimination in a society may be treated differently and hence obtain worse outcomes in areas such as credit, employment, and the like through structural discrimination alone, irrespective of personal choices and characteristics. A machine learning model trained to predict these outcomes based on data that includes information that could identify an individual as belonging to such a class may therefore inadvertently reinforce discrimination by effectively predicting negative outcomes based on membership in the class. Accordingly, improved techniques for training and executing accurate prediction models while reducing algorithmic bias are desired.

BRIEF DESCRIPTION OF THE DRAWINGS

The included drawings are for illustrative purposes and serve only to provide examples of possible structures and operations for the disclosed inventive systems, apparatus, methods and computer program products for bias reduction in machine learning model training and execution. These drawings in no way limit any changes in form and detail that may be made by one skilled in the art without departing from the spirit and scope of the disclosed implementations.

DETAILED DESCRIPTION

Figure 1:
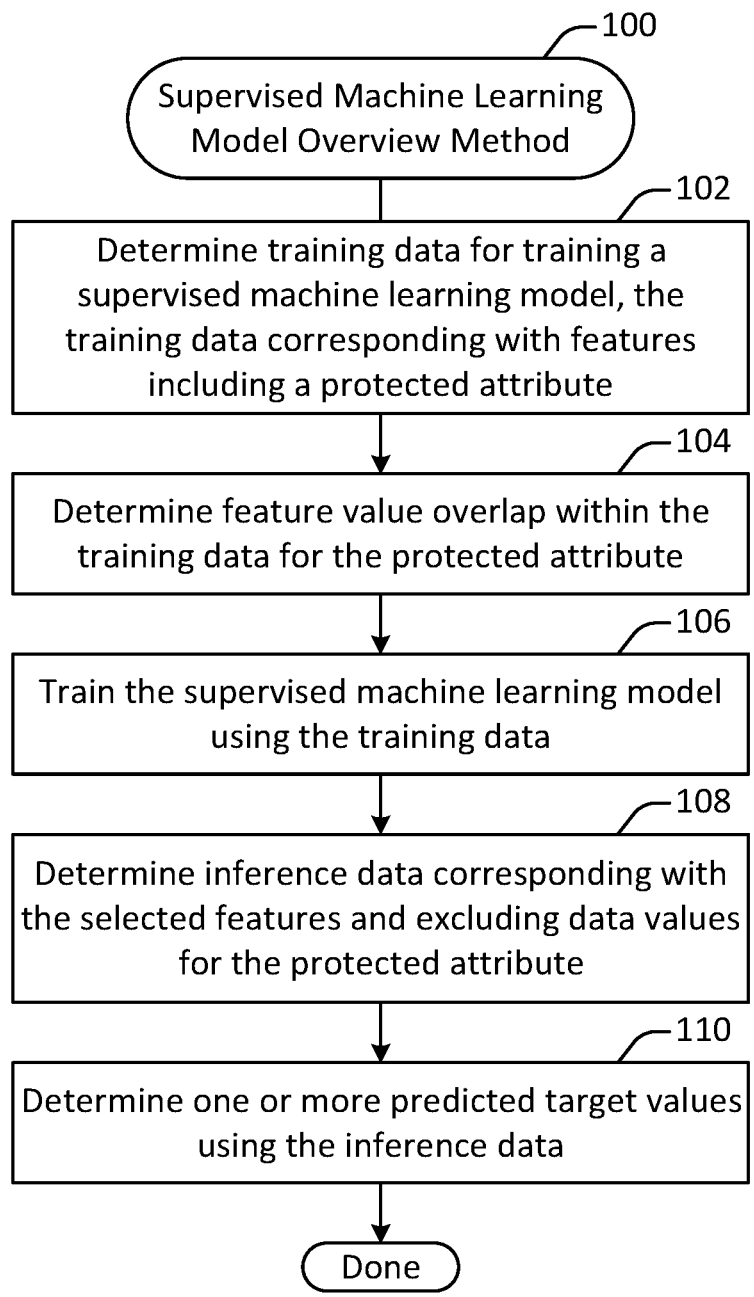
FIG. 1 illustrates an example of a machine learning model overview method, performed in accordance with one or more embodiments.

Various personal attributes may be used to predict future success in higher education, employment, or credit. Such prediction models may then be used to assist in making determinations such as whether to admit a person to an educational institution, whether to extend an offer of employment, or whether to extend an offer of credit. However, some personal attributes such as race or gender may be considered as inappropriate, as their use in prediction models may result in impermissible or undesired bias against particular classes of people. Accordingly, many models omit such attributes.

Even when protected attributes are omitted from prediction models, non-protected attributes such as educational institution or personal residence postal zip code may strongly predict one or more protected attributes such as race or gender. For example, having knowledge that an applicant previously attended a historically Black college or university (HBCU) could inform the model that the applicant is most likely Black. Then, despite possessing characteristics otherwise comparable to creditworthy individuals of other races, the applicant having attended an HBCU may be discriminated against, to the extent that being Black correlates with credit default. For this reason, the use of some otherwise non-protected data in a prediction model can create a source of confounder bias along a protected attribute inside the model. That is, models using certain types of otherwise non-protected data may cause overt, intentional discrimination (i.e., disparate treatment), even though the protected attribute is not directly used in the model. Accordingly, even non-protected attributes are omitted from many prediction models. However, such omissions may weaken the predictive power of the model. For instance, an applicant's zip code may be omitted from a model because it can be highly predictive of race (due to redlining), despite the fact that zip code can also provide powerfully predictive information about an applicant's likelihood of default that is entirely unrelated to race (for example, living in a Rust Belt zip code versus a Sun Belt zip code).

Techniques and mechanisms described herein provide for the reduction or elimination of some types of bias in machine learning models. A supervised machine learning process may be modeled as a casual Bayesian network. A set of training data that includes observed outcome values, observed predictor values, and observed protected attribute values are used to train the prediction model in a training phase. One or more performance metrics may be determined and used to evaluate the trained model and improve the training process. Then, to predict one or more unobserved outcome values, the trained prediction model may be applied to inference data. The inference data may either omit the protected attribute entirely or may include default values substituted for actual values associated with the protected attribute.

In some implementations, techniques and mechanisms described herein may significantly improve the predictive quality of some prediction models by allowing for the use of new sources of data while reducing or eliminating unacceptable or impermissible bias that would result from the use of such new data sources in connection with conventional techniques.

According to various embodiments, techniques and mechanisms described herein may be used to address disparate treatment, a particular type of discrimination that is conceptually and often legally distinct from disparate impact. That is, a difference in decisions across groups (i.e., disparate impact) does not necessarily imply that a prediction model treats people in the groups differently (i.e., disparate treatment). For instance, a model in which women are on average are predicted to be somewhat less creditworthy than men may not be deemed discriminatory when the result merely reflects differences between the two groups in characteristics such as income. However, a model in which a woman is deemed less creditworthy than a man despite the two observations being generally comparable in characteristics other than gender may be deemed unfairly discriminatory.

Many conventional approaches to addressing bias in machine learning have relied on statistical or correlational approaches that measure disparities in outcomes across groups. However, such approaches have significant limitations because discrimination is based on causation, not correlation. Accordingly, such conventional approaches often result in models with relatively limited predictive power. In contrast, some techniques and mechanisms described herein are based on a causal, Bayesian analysis rather than a statistical or correlational approach, thus avoiding these problems.

Other conventional approaches to addressing bias in machine learning have attempted to adopt a causal approach. However, such approaches typically provide only a partial model of fairness and discrimination that do not entirely address the problem. Moreover, such approaches typically require complex modeling of causal relationships, rendering the solutions unclear as to whether or not disparate treatment has been eliminated. In contrast, techniques and mechanisms described herein model the entire supervised machine learning process itself as a causal Bayesian network, thus providing a way to build a complete model of fairness and discrimination. Thus, techniques and mechanisms described herein provide for the reduction or elimination of confounder bias from a supervised machine learning model.

According to various embodiments, techniques and mechanisms described herein may be used to address discrimination across a variety of dimensions. Examples of such dimensions may include, but are not limited to: race, ethnicity, sex, gender, sexual orientation, transgender status, national origin, religion, disability status, age, skin color, genetic information, marital status, and receipt of public assistance.

FIG. 1 illustrates an example of an arrangement of a supervised machine learning model overview method 100, performed in accordance with one or more embodiments. According to various embodiments, the method 100 may be performed on one or more computing devices to train a machine learning model and then use the trained model to predict one or more unobserved outcome values in a way that reduces bias based on one or more protected attributes.

Training data for training a supervised machine learning model is determined at 102. According to various embodiments, the training data includes a set of observations that each corresponds with a unit of analysis, such as an individual. Each observation includes a number of data values that correspond with features, including one or more protected attributes.

Feature overlap within the training data for the protected attribute or attributes is determined at 104. According to various embodiments, the feature overlap may identify a degree to which particular values of a protected attribute overlap with particular values or combinations of values of other features. For example, some colleges have historically restricted admission to either men or women. A college to which only women have been admitted would therefore overlap entirely with a value of "female" for the feature "gender", which in some models may be considered a protected attribute. The lack of overlap for "gender" with "male" for students who attend that college could also be called a positivity violation.

According to various embodiments, a protected attribute may be any feature for which bias is to be removed. Values corresponding with the protected attribute may be included when training the supervised machine learning model. Values corresponding with the protected attribute may then be omitted or replaced with default values during the inference phase. It should be noted that an attribute considered as protected in one model may not be considered as protected in a different model.

A machine learning model is trained at 106 using the training data. According to various embodiments, the particular operations performed to train the model may depend in part on the type of model being trained. For instance, the model may be a neural network model, regression model, gradient boosting machine, tree-based model, ensemble model, or other type of model. Additional details regarding the training of such a model are described with respect to the method 400 shown in FIG. 4.

Inference data including one or more observed predictor values is determined at 108. According to various embodiments, the inference data may include observations similar to those included in the training phase except that the target values have not yet been observed. In some implementations, the inference data may simply omit the protected attribute values entirely. Alternatively, the inference data may include substituted protected attribute values.

One or more predicted target values are predicted at 110 by applying the machine learning model to the inference data. Additional details regarding the determination of inference data and the application of the trained machine learning model to inference data are described with respect to the method 800 shown in FIG. 8.

Figure 2:
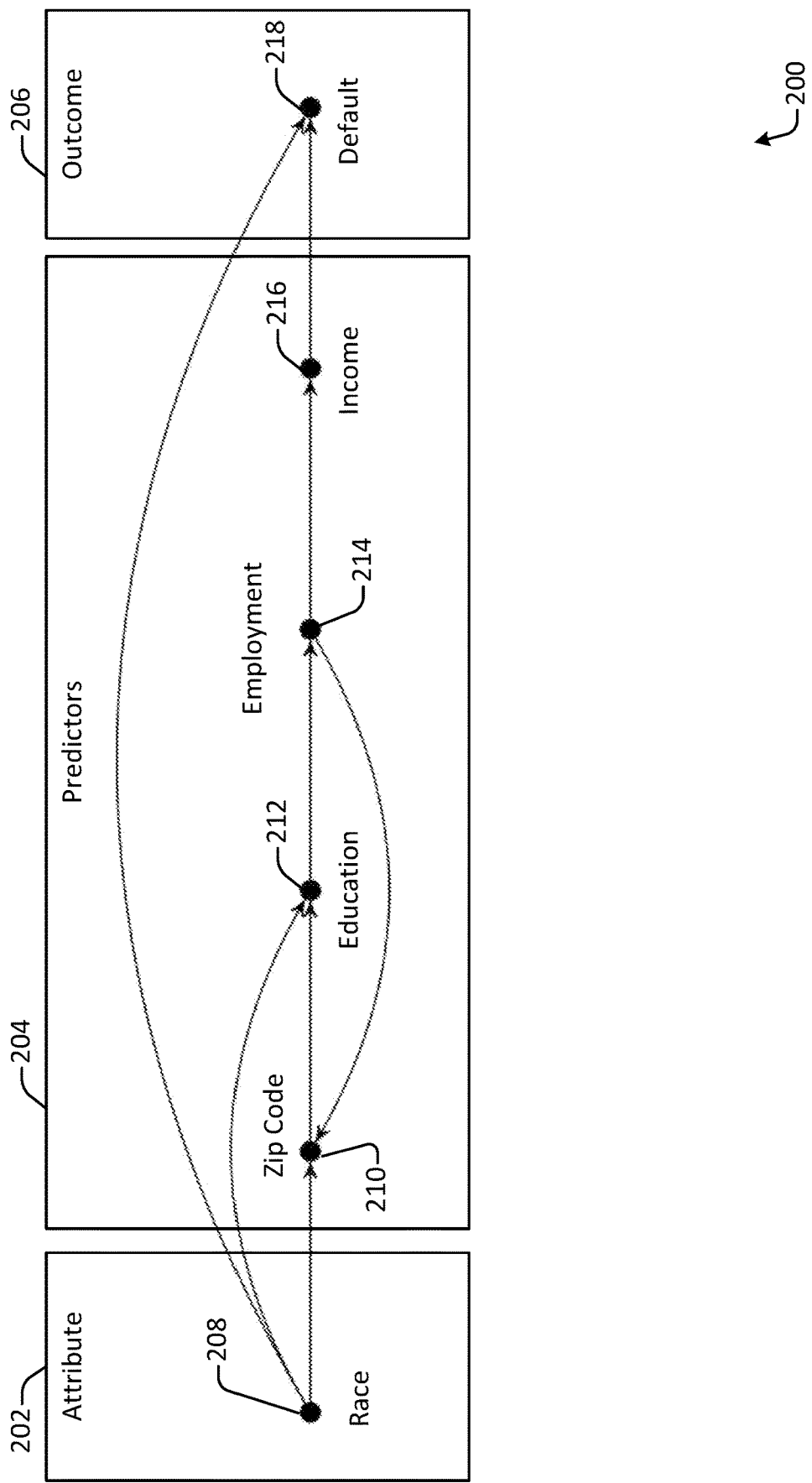
FIG. 2 illustrates an example of a model representation, configured in accordance with one or more embodiments.

FIG. 2 illustrates an example of a model representation 200, configured in accordance with one or more embodiments. FIG. 2 illustrates causal relationships represented by arrows between observable data values represented by dots. The model representation 200 illustrates an example of how a protected attribute such as race could be causally related to a target variable such as credit default or criminal recidivism.

In FIG. 2, a person's Race can influence the Zip Code that the person lives in, which can then influence the person's access to Education, which can then influence their Employment opportunities, which can then influence their Income, which can then influence their probability of Default on a loan. In addition, a person's race may directly affect their education opportunities (e.g., via discrimination, or a decision to attend a particular university). Also, Employment opportunities 214 may affect a person's Zip Code 210, for instance if the person decides to move to pursue a new job. Finally, a direct connection may exist between Race 208 and Default 218. Such a connection does not indicate that a person's Race directly causes Default. Rather, it instead indicates only that a different causal pathway exists apart from the path from Zip Code 210 to Default 218 that is not represented in the model, for instance via family wealth. For this reason, in many contexts an attribute such as Race is treated as protected and excluded from the model, since its inclusion could lead the model to generate discriminatory predictions.

According to various embodiments, one challenge in machine learning is that models such as that shown in FIG. 2 are difficult to analyze because they contain loops such as the loop from Zip Code 210 to Education 212 to Employment 214 and back to Zip Code 210. Another challenge may be that non-protected attributes such as Zip Code may act as a proxy for a protected attribute such as Race. For example, consider a model in which a protected attribute 202 is omitted from both training and inference but the other predictors 204 are retained. Such an approach may not address the bias problem since a person's Zip Code 210 may act as a proxy for Race 208, leading to similar bias.

FIG. 3A, FIG. 3B, FIG. 3C, FIG. 3D, FIG. 3E, and FIG. 3F are diagrams that illustrate various types of causal relationships, generated in accordance with one or more embodiments.

Figure 3A:
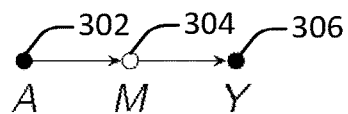
FIG. 3A, FIG. 3B, FIG. 3C, FIG. 3D, FIG. 3E, and FIG. 3F are diagrams that illustrate various types of causal relationships, generated in accordance with one or more embodiments.

In FIG. 3A, A 302 represents a protected attribute, such as race or gender, while Y 306 represents a target variable, such as default on a loan. Although the protected attribute 302 may have some correlation with the target variable Y 306, we assume that there is a mediating construct M 304, such as creditworthiness, that explains away this relationship in a causal sense. That is, conditional on the mediating construct M 304, the protected attribute A 302 and the target variable Y 306 are independent. Put another way, the mediating construct M 304 d-separates A 302 from Y 306.

Figure 3B:
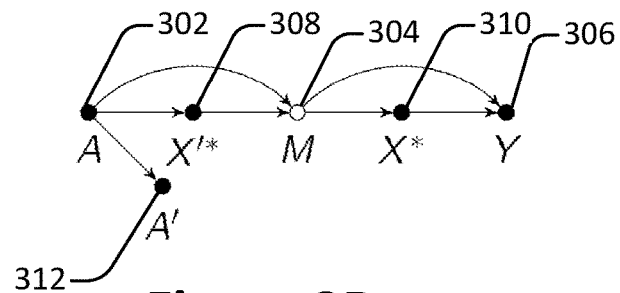

In FIG. 3B, protected attribute pure proxies A' 312 purely proxies for the protected attribute A 302 and are removed from the set of features used in both training and inference. For instance, hair length may proxy for gender but may have no relevance to predicting creditworthiness. In some implementations, protected attribute pure proxies A' 312 may be removed manually. Alternatively, or additionally, one or more protected attribute pure proxies A' 312 may be removed during the training phase. For instance, features that have low predictive power but that are highly correlated with values corresponding with the protected attribute A 302 may be automatically removed.

In addition, FIG. 3B also introduces traditional features X* 310 and alternative features X' 308. The traditional features X* 310 includes any features that measure or proxy for the mediating construct M 304. For instance, income may be considered a proxy for creditworthiness. The alternative features X'* 308 includes any features that may affect the mediating construct M 304 but that may also be seen as proxying for the protected attribute A 302 due to confounder bias. For instance, zip code may partially predict credit worthiness but may also proxy for a protected attribute such as race.

Figure 3C:
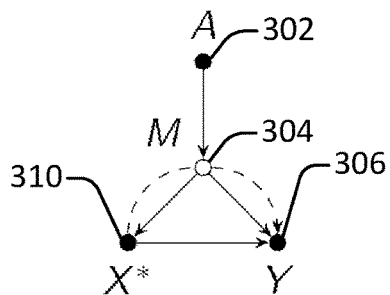
Figure 3D:
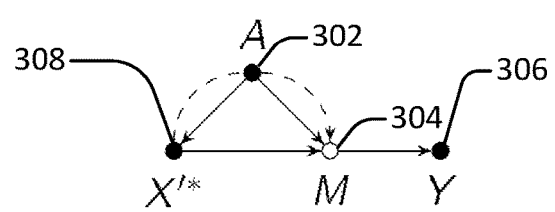

According to various embodiments, the traditional features X* 310 represents data traditionally used to predict the target variable Y 306. As shown in FIG. 3C, the target variable Y 306 may be predicted directly by the traditional features X* 310, by the mediating construct M 304, and indirectly by the traditional features X* 310 through the mediating construct M 304. For instance, higher income may be directly indicative of an ability to pay off a loan. At the same time, higher income may be indirectly indicative of creditworthiness (such as having more financial assets), which may also in turn lead to higher income. However, in FIG. 3C, the protected attribute A only affects the target variable Y 306 via the mediating construct M 304. Therefore, X* 310 does not act as a proxy for A 302, even if X* 310 is correlated with A 302.

Figure 3E:
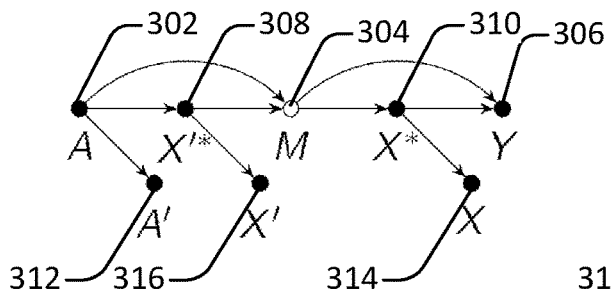

According to various embodiments, the alternative features X'* 308 represents data that is not traditionally used to predict the target variable Y 306. As shown in FIG. 3E, the mediating construct M 304 is assumed to completely explain any relationship between the protected attribute A 302 and the target variable Y 306, as well as between the alternative features X'* 308 and the target variable Y 306. The alternative features X'* 308 may directly predict the mediating construct M 304. However, the alternative features X'* 308 may also indirectly predict the mediating construct M 304 by proxying for the protected attribute A 302. For example, a particular zip code may be indicative of wealth and thereby predict credit worthiness. However, a particular zip code may also be a proxy for race. For this reason, models predicting creditworthiness traditionally exclude zip code as a feature to avoid inadvertently discriminating against people of a particular race (e.g., via redlining).

Figure 3F:
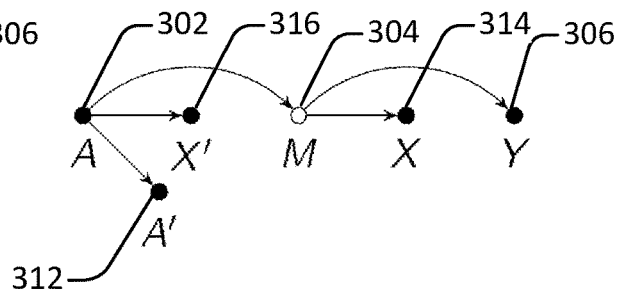

FIG. 3F introduces traditional feature data X 314 and alternative feature data X' 316. As discussed with respect to protected attribute A 302 in FIG. 3B, the traditional features X* 310 and the alternative features X*' 308 are imperfectly measured by traditional feature data X 314 and alternative feature data X' 316. For example, in a prediction model a person's income may be self-reported or proxied based on an estimate or range. Accordingly, in FIG. 3F, although the traditional feature data X 314 and alternative feature data X' 316 do not directly cause the mediating construct M 304 and the target variable Y 306, they may nevertheless be used in training and inference data sets.

According to various embodiments, techniques and mechanisms described herein may be applied to textual data. For instance, text sources such as a loan application, resume, voice interview recording, or other such source of textual data may be analyzed to identify textual data. The textual data may then be cleaned by applying operations such as parsing, tokenization, removal of stop words, and the like.

In some embodiments, a bag-of-words or n-gram approach may be used to tokenize the textual data into individual words and phrases. Some or all of these words and phrases may then be used to predict an outcome such as job performance or loan default. However, some words and phrases, such as "women" and "God bless", act as pure proxies A' 312 and would be removed from the model. Other words like "executed" and "captured" (which are more frequently used by men on their resumes) may be highly correlated with protected attributes such as sex but still have a direct effect on the target variable Y 306. Accordingly, some words and phrases may be treated in the model in a manner similar to zip code or other such features that are correlated with protected classes.

Figure 4:
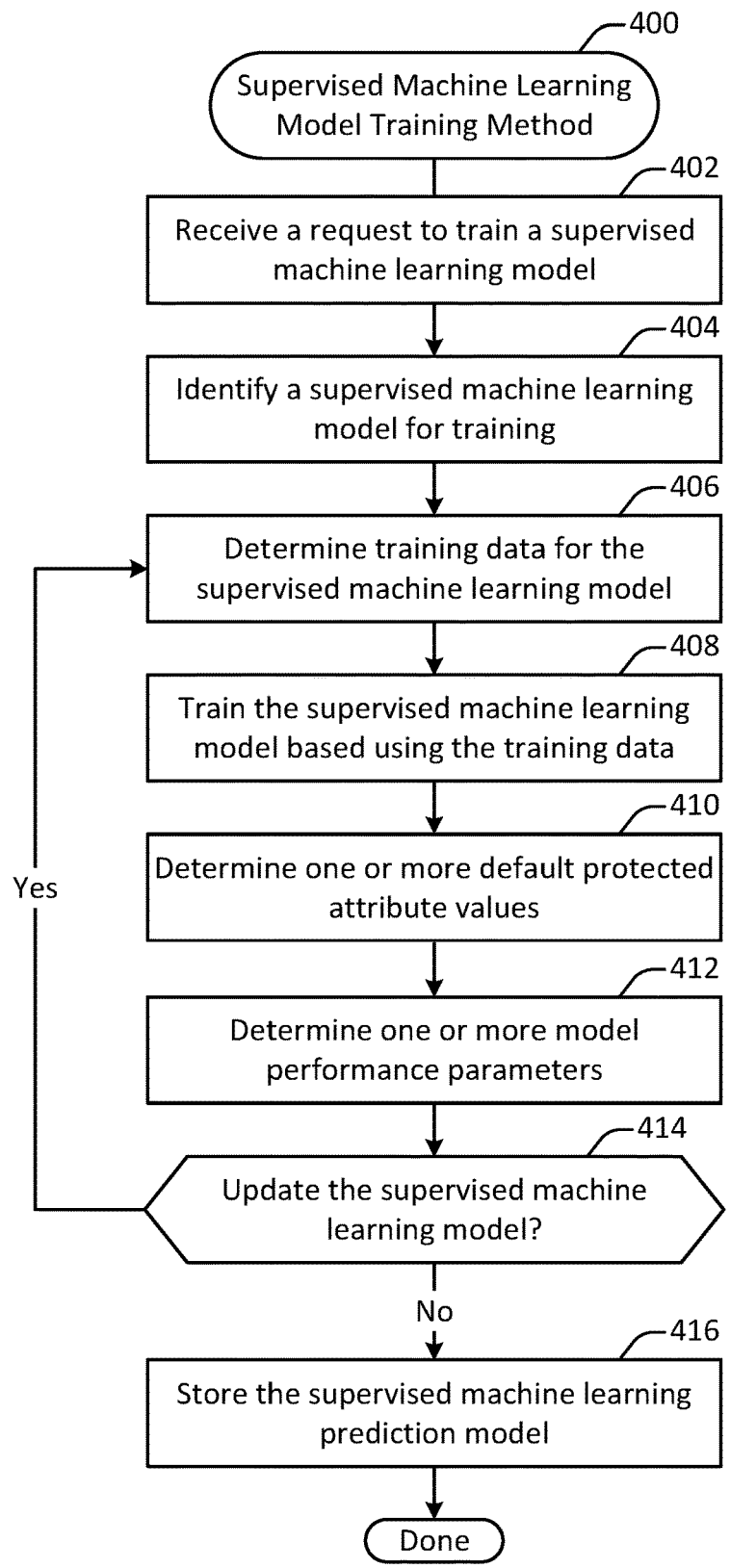
FIG. 4 illustrates an example of a method for training a prediction model, performed in accordance with one or more embodiments.

FIG. 4 illustrates an example of a method 400 for training a supervised machine learning model, performed in accordance with one or more embodiments. According to various embodiments, the method 400 may be implemented on any suitable computing device.

A request to train a supervised machine learning model, which is also referred to herein as a prediction model, is received at 402. According to various embodiments, the request may be generated manually or automatically. The request may include some or all of the information identified in FIG. 4, such as target value data and training data. Alternatively, or additionally, the request may identify or refer to such information.

A supervised machine learning model is identified for training at 404. According to various embodiments, any of a variety of supervised machine learning models may be employed. Examples of suitable machine learning models include, but are not limited to: decision trees, tree-based models, gradient boosting models, deep learning models, neural networks, and regression models.

Training data for the prediction model are identified at 406. The training data may include data identifying target values to predict, protected attribute data values, data values corresponding to traditional features used to predict the target values, and data values corresponding to alternative features used to predict the target values.

According to various embodiments, the training data may be divided into a plurality of observations. For example, an observation may correspond to an individual, an organization, or any other suitable unit of analysis. Each observation may in turn be associated with one or more protected attribute values, one or more values corresponding with traditional features, one or more values corresponding with alternative features, and a target value.

In some embodiments, target values may correspond to any values a supervised machine learning model may be trained for predict. For example, outcome values may include, but are not limited to, criminal recidivism, professional performance, educational performance, and credit default. In general, target values may be observable for historical data, to aid in training the supervised machine learning model. However, target values may be unobserved during the inference phase, at least at the time of inference.

According to various embodiments, target values may include discrete or continuous variables. For example, a discrete target value may be whether a loan applicant will default on a loan, while a continuous target variable may be an interest rate for a loan or a purchase price for an asset such as a house.

In some embodiments, traditional and alternative feature data values may correspond to any values not identified as an outcome value or a protected attribute value that are observable before the corresponding outcome value. Feature data values may indicate or measure characteristics such as education level, education performance, professional experience, income, age, location of residence, and/or any other relevant information used for the purpose of training and applying a machine learning model. It should be noted that the status of a variable as a feature or a protected attribute might differ, for instance depending on the application. For example, age may be considered a feature in some applications but a protected attribute in other applications. Additional details for determining training data for the supervised machine learning model are discussed with respect to the method 600 shown in FIG. 6.

The supervised machine learning model is trained at 408 using the training data. According to various embodiments, the particular operations employed to train the supervised machine learning model may depend in significant part on the prediction model employed. In some configurations, the scikit-learn Python package may be used for example to train the supervised machine learning model.

One or more default protected attribute values are determined at 410. According to various embodiments, the default protected attribute values may be used during the test and inference phases to replace actual protected attribute values. Various approaches may be used to determine default protected attribute values. For example, protected attribute values may be dropped completely and treated as missing. As another example, protected attribute values may be replaced with a single value for all observations. For instance, in a data set in which each observation corresponds to a person, the race of each individual may be set to a default value (e.g., Black, White, etc.), while the gender of each individual may be set to a default value (e.g., female, male, etc.). In this way, the actual race and gender of an individual may be masked during the test and inference phases so that it may not generate disparate treatment bias.

One or more model performance parameters are determined at 412. According to various embodiments, the model performance parameters may include one or more parameters related to the predictive performance of the supervised machine learning model. For instance, the model performance parameters may include one or more of accuracy, lift, precision, recall, or area under a receiver operator curve (AUC).

In some implementations, the model performance parameters may include one or more parameters related to bias. For example, the model performance parameters may compare a predicted outcome rate for members of a protected attribute value class under one or more variations of the model. As another example, the model performance parameters may compare a predictive performance of the model for particular values of a protected attribute. Additional details regarding the determination of model performance parameters are discussed with respect to the method 700 shown in FIG. 7.

A determination is made at 414 as to whether to update the supervised machine learning model. In some implementations, the supervised machine learning model may continue to be updated until one or more termination criteria are met. Such criteria may include, but are not limited to: a designated number of iterations, a designated level of predictive performance, a designated level of increase in predictive performance.

The supervised machine learning model is stored on a storage device at 416. In some implementations, storing the supervised machine learning model may involve storing one or more weights or values suitable for use in applying the supervised machine learning model to novel data. For example, in a regression model, storing the supervised machine learning model may involve storing regression coefficients. As another example, in a neural network model, storing the supervised machine learning model may involve storing weights associated with various neurons in the neural network.

FIG. 5A, FIG. 5B, FIG. 5C, and FIG. 5D represent diagrams illustrating how prediction models may be used to predict a target variable, generated in accordance with one or more embodiments.

Figure 5A:
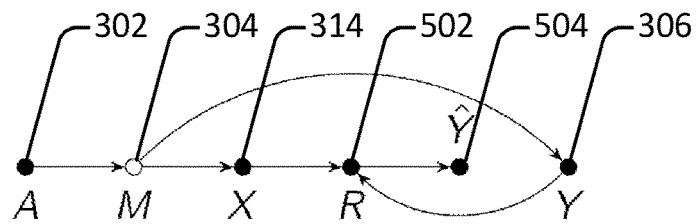
FIG. 5A, FIG. 5B, FIG. 5C, and FIG. 5D represent diagrams illustrating how prediction models may be used to predict a target variable, generated in accordance with one or more embodiments.

FIG. 5A represents a training phase using traditional feature data X 314. In FIG. 5A, traditional feature data X 314 is used as a measure for the mediating construct M 304 to train a prediction model to produce a score R 502. The score R 502 is then used to reach a decision Ŷ 504. The training is performed by using observed target outcome values Y 306 to determine the model's parameters. For instance, one or more metrics of model performance may be generated based on a comparison of Ŷ 504 with Y 306. However, alternative data X' is omitted to avoid training the prediction model to be biased.

Figure 5B:
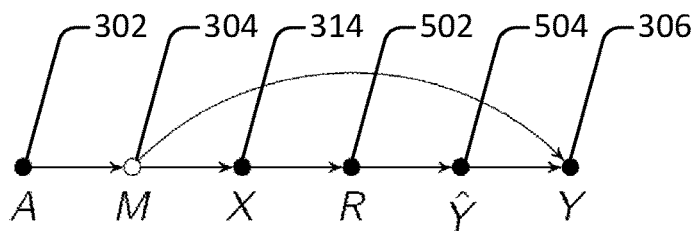

FIG. 5B represents an inference phase using traditional data X 314. In FIG. 5B, the prediction model trained in FIG. 5A is applied to the traditional feature data X 314 as a measure for the mediating construct M 304 to produce a score R 502. The score R 502 is then used to reach a decision Ŷ 504. Of course, in some configurations Ŷ 504 may or may not affect Y 306. For instance, making a determination to extend a loan enables the possibility of loan default, whereas making a determination not to extend a loan removes the possibility of loan default.

Figure 5C:
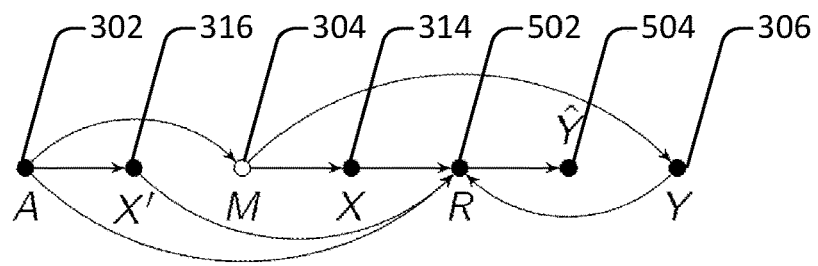

FIG. 5C represents a training phase using traditional feature data X 314 and alternative feature data X' 316. In FIG. 5A, both traditional feature data X 314 and alternative feature data X' 316 are used to train a prediction model to produce a score R 502, even though the alternative feature data X' 316 may proxy for the protected attribute A 302. To correct for this, and in contrast to FIG. 5A, data representing the protected attribute A 302 is also used to train the model (this is known in causal terminology as a backdoor adjustment). The score R 502 is then used to reach a decision Y 504. The training is performed by using observed target outcome values Y 306 to determine the model's parameters. For instance, one or more metrics of model performance may be generated based on a comparison of Y 504 with Y 306.

Figure 5D:
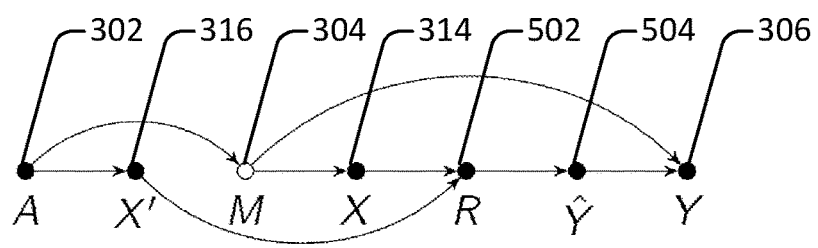

FIG. 5D represents an inference phase using traditional feature data X 314 and alternative feature data X' 316. In FIG. 5D, the prediction model trained in FIG. 5C is applied to the traditional feature data X 314 and alternative feature data X' 316 to produce a score R 502. The score R 502 is then used to reach a decision Y 504. Of course, in some configurations Ŷ 504 may or may not affect Y 306. For instance, making a determination to extend a loan enables the possibility of loan default, whereas making a determination not to extend a loan removes the possibility of loan default. In FIG. 5D, data representing the protected attribute A 302 is omitted. The omitted data may be dropped entirely or may be replaced with default data (in causal terminology this could be considered an intervention with a "do" operator, such as do(A=White) for race or do(A=Male) for gender). For instance, all values for race may be set to a single default value.

Figure 6:
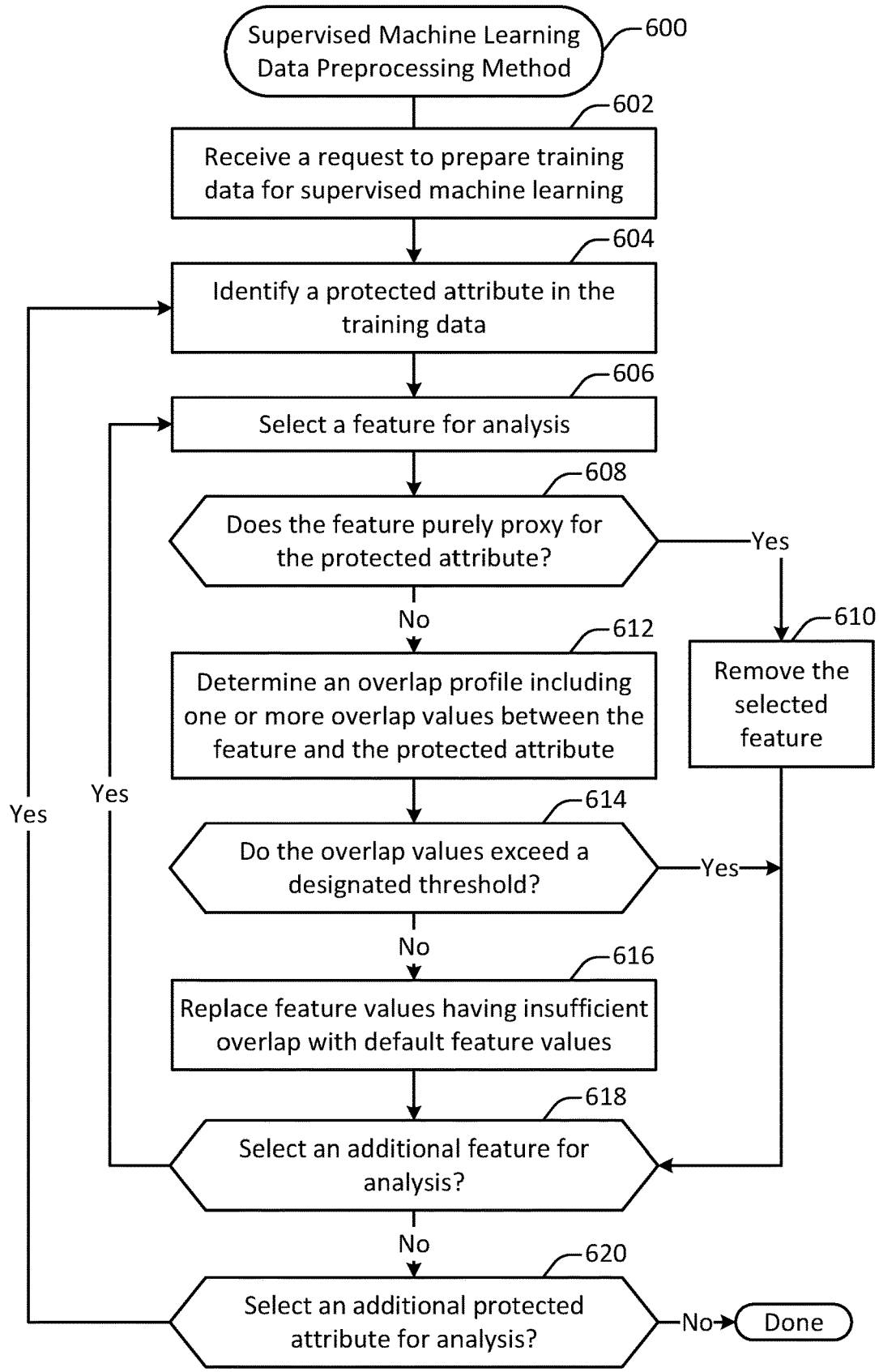
FIG. 6 illustrates an example of a method for preprocessing supervised machine learning data, performed in accordance with one or more embodiments.

FIG. 6 illustrates an example of a method 600 for preprocessing supervised machine learning data, performed in accordance with one or more embodiments. According to various embodiments, the method 600 may be performed at any suitable computing device.

A request is received at 602 to prepare training data for supervised machine learning. According to various embodiments, the request may be generated as discussed with respect to operation 406 shown in FIG. 4.

A protected attribute is identified in the training data at 604. According to various embodiments, protected attributes in the training data may be identified based on membership in a set of protected attributes. As discussed herein, which attributes are deemed as protected may be specific to a particular context.

A feature is selected for analysis at 606. According to various embodiments, features may be analyzed in any suitable order, in sequence or in parallel. In some embodiments, all features in the training data may be analyzed. Alternatively, only features that meet some suitable criteria may be analyzed. For instance, features may not be selected for analysis when they are considered traditional data, but may be selected for analysis when they are considered alternative data.

A determination is made at 608 as to whether the feature purely proxies for the protected attribute (in causal terminology, this means that the feature has no direct causal relationship to the target variable). This would correspond to A' 312 in FIG. 3F. If it is determined that the feature purely proxies for the selected attribute, then the selected feature is removed from the model and training data at 610.

In some implementations, the determination made at 608 may involve determining one or more characteristics related to the feature and the protected attribute. For example, the determination may involve determining one or more correlations or truth tables between values of the feature and values of the protected attribute. As another example, the determination may involve determining some measure of predictive power, alone or in combination with other features, that the selected feature has in predicting target outcome values.

As one example, an attribute such as hair length may be highly correlated with gender but have very little predictive power in predicting a target outcome such as job performance, and hence be deemed a pure proxy for gender. In contrast, an attribute such as education may be somewhat highly correlated with race but nevertheless may provide significant predictive power in models predicting credit default, and hence be deemed not a pure proxy for race. That is, education may have both a direct causal effect in predicting credit default, as well as an indirect causal effect through race.

According to various embodiments, whether a particular combination of characteristics is deemed to indicate that a feature is a proxy for protected attribute A 302 may be determined by comparing one or more of the characteristics or combinations of characteristics against one or more threshold values. Moreover, different threshold values may be used in different contexts. For example, the predictive power of the model may be generally enhanced by including more features, while bias may be reduced by removing features that more purely proxy for a protected attribute. When evaluating predictive power, operation 608 may be performed in conjunction with one or more operations discussed with respect to the method 700 shown in FIG. 7.

An overlap profile including one or more overlap values between the feature and the protected attribute A 302 is determined at 612. According to various embodiments, the overlap profile may identify instances in which a combination of values occurs. In causal language, this allows us to identify positivity violations.

As a specific example, consider an overlap profile comparing values of gender with values of university institution among a training data set to identify a number and/or percentage of attendees of each institution who are classified as men or women. For many institutions, the overlap values may be high. For example, a training data set may include instances of both men and women who attended Purdue University, with the percentage of men attending the institution being relatively close to 50%. However, for other institutions, the overlap values may be low. For instance, a training data set may include relatively few if any observations in which a man attended a college historically attended only by women, such as Smith College, with the percentage of men attending the institution being relatively close to 0%. Therefore, an algorithm would not be able to isolate the direct treatment effect of one's attendance at Smith College for causing credit default versus its indirect backdoor proxy effect through gender, even if the algorithm had access to the protected attribute.

In some embodiments, a prediction model trained on data values having insufficient overlap may risk creating bias due to overfitting on rare events. For instance, a handful of men who attended a historically women-only college may have an outsized effect on the predictions produced by a model for such individuals. Accordingly, the data may need to be adjusted to preemptively reduce such bias. Insufficient overlap may be referred to as a positivity violation.

At 614, a determination is made as to whether the overlap values exceed a designated threshold. According to various embodiments, the designated threshold may be determined so as to avoid or prevent positivity violations, and may depend on the goals or context associated with the prediction model. For example, higher threshold levels may improve model prediction at the expense of increasing potential bias, while lower threshold levels may reduce potential bias but also model predictive power. In particular embodiments, the designated threshold may depend on any of a variety of characteristics, such as the rarity of other combinations of features in the training data, the number of features included in the training data, and the like.

If one or more of the overlap values fail to exceed a designated threshold, then at 616 the feature values having insufficient overlap are replaced with default feature values. According to various embodiments, various approaches may be used to determine default feature values. For example, feature values with insufficient overlap may be dropped completely and treated as missing. As another example, feature values with insufficient overlap may be replaced with comparable feature values that have sufficient overlap. For instance, a particular educational institution (e.g., Smith College) in an observation may be replaced with a different educational institution of comparable quality and characteristics (e.g., New York University). As yet another example, feature values with insufficient overlap may be replaced with more generalized feature values. For instance, a zip code may be replaced with a city and state, or a particular education institution (e.g., Smith College) may be replaced with a general descriptor (e.g., 4-year college in Massachusetts). The feature value replacement rules used to determine the default values may depend on the particular empirical context. However, any rules applied at 616 to replace feature values may be stored so that the same rules can be applied during the inference phase.

Alternatively, or additionally, a protected attribute feature value may be replaced to eliminate the positivity violation. For instance, a protected attribute feature value may be replaced with an aggregate value. For example, a zip code may contain Whites, Blacks, and Latinos but few if any Asians. In this example, rather than treating each of the racial groups separately, Whites and Asians may be aggregated as one group and Blacks and Latinos aggregated as another group. Such a replacement would then provide the overlap needed to avoid positivity violations. For clarity, a positivity violation may be corrected using one or more feature value replacement rules, one or more protected attribute replacement rules, or a combination thereof.

A determination is made at 618 as to whether to select an additional feature for analysis. In some implementations, as discussed with respect to operation 606, all features in the training data may be analyzed. Alternatively, only features that meet some suitable criteria may be analyzed. For instance, features may not be selected for analysis when they are considered traditional data, but may be selected for analysis when they are considered alternative data.

If no additional feature is selected for analysis, then a determination is made at 620 as to whether to select an additional protected attribute for analysis. According to various embodiments, each protected attribute included in the training data may be analyzed to determine whether to remove proxies and/or determine default data values.

Figure 7:
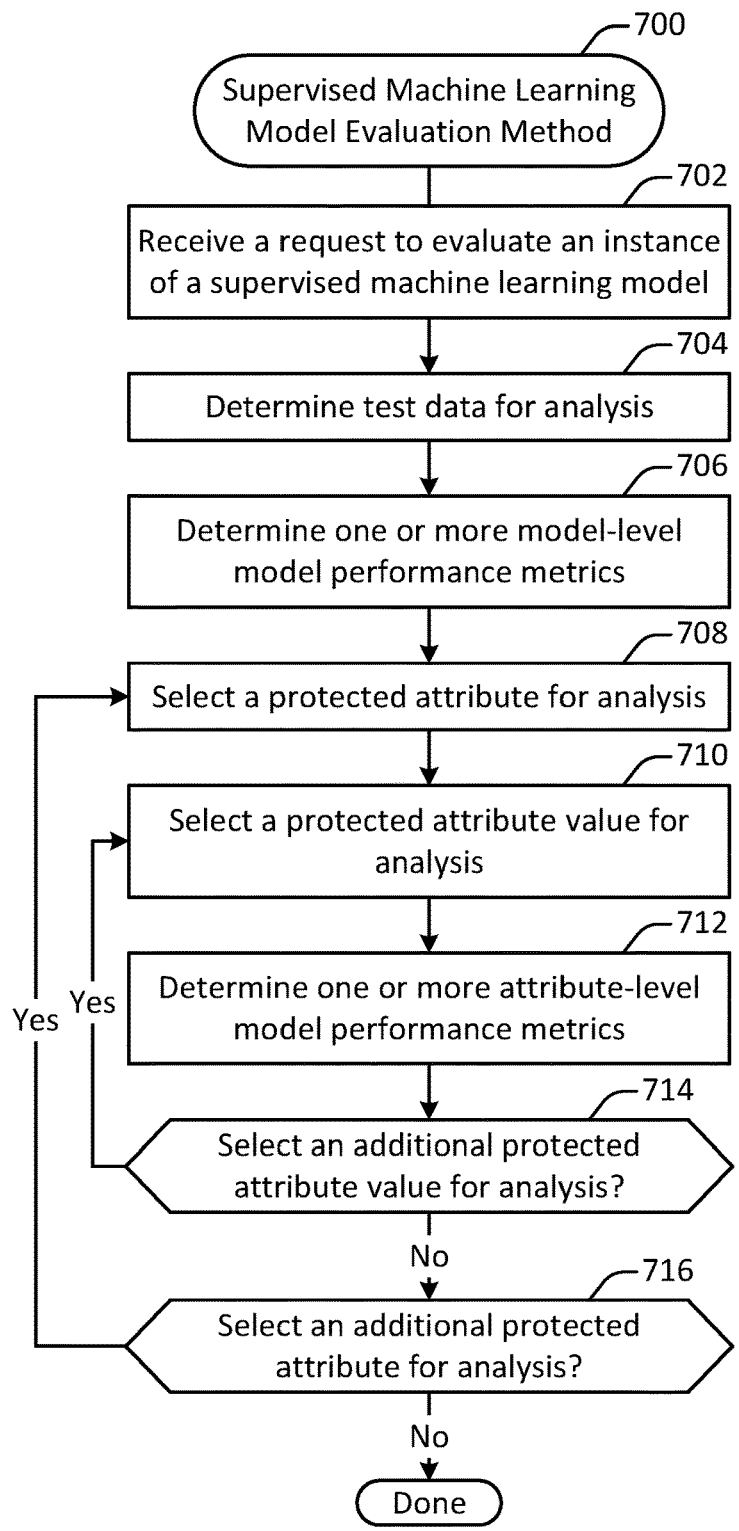
FIG. 7 illustrates an example of a method for evaluating a supervised machine learning model, performed in accordance with one or more embodiments.

FIG. 7 illustrates an example of a method 700 for evaluating a supervised machine learning model, performed in accordance with one or more embodiments. According to various embodiments, the method 700 may be performed on any suitable computing device.

A request is received at 702 to evaluate an instance of a supervised machine learning model. According to various embodiments, the request may be generated as discussed with respect to operation 406 shown in FIG. 4.

Test data for analysis is determined at 704. According to various embodiments, a training data set may be divided into data used to actively train the model and data used to test the performance of the training. For example, K-fold validation is one such technique. Accordingly, the test data may include any data remaining after applying the training data to train the model.

Figure 8:
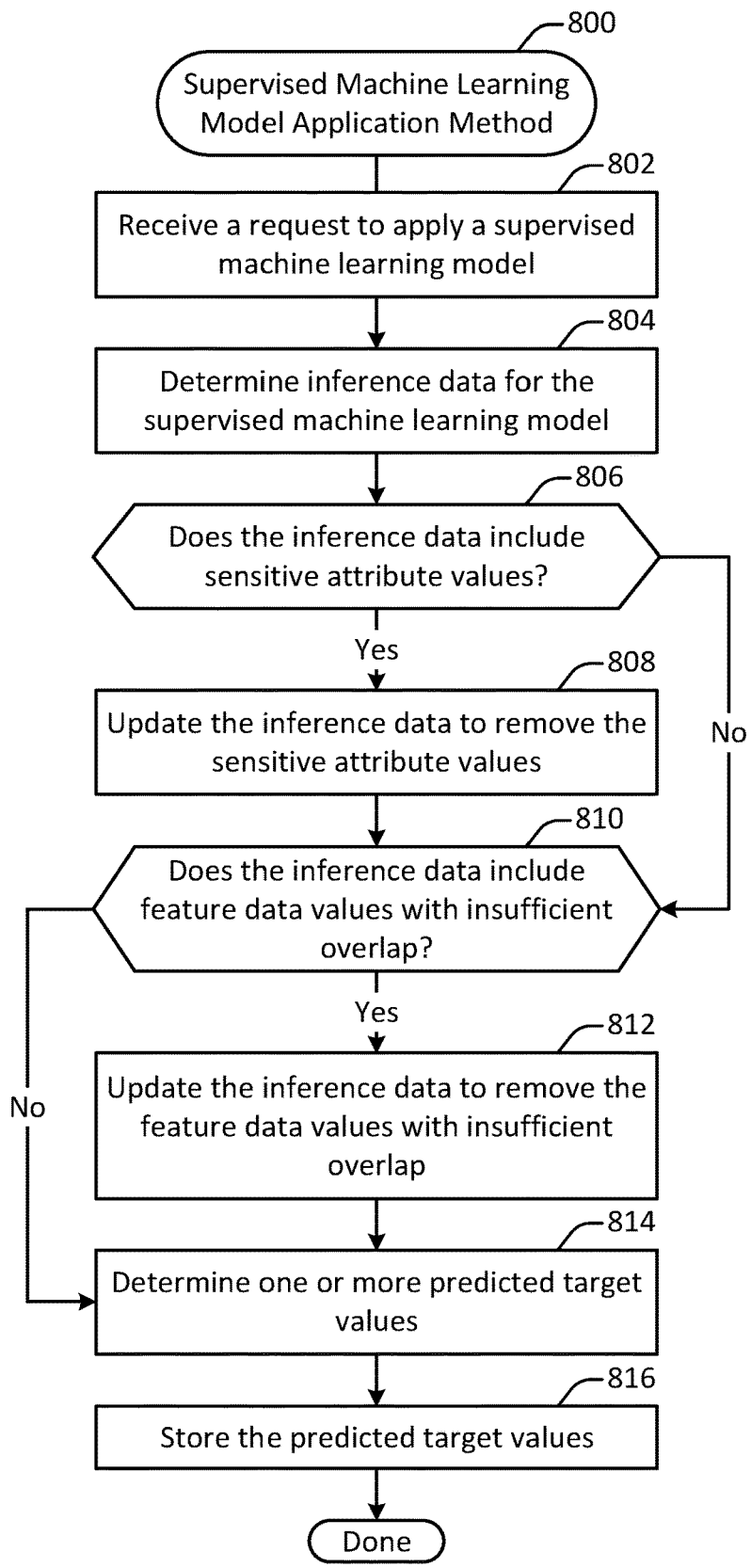
FIG. 8 illustrates an example of a method for applying a prediction model, performed in accordance with one or more embodiments.

In some implementations, a test data set may be preprocessed using some or all of the techniques discussed with respect to operation 406 and the method 800 shown in FIG. 8. That is, the same rules used to determine default data values for feature values exhibiting insufficient overlap or positivity violations may be applied to the test data set.

One or more model-level model performance metrics are determined at 706. According to various embodiments, any of a variety of suitable model-level model performance metrics may be determined. Examples of such metrics may include, but are not limited to: accuracy, lift, precision, recall, and area under a receiver operator curve (AUC). Performance metrics may include fairness measures, such as demographic/statistical parity. Such fairness measures may or may not involve controlling for other features, like income.

A protected attribute is selected for analysis at 708. According to various embodiments, each protected attribute included in the test data may be selected for analysis. Attributes may be analyzed in sequence, in parallel, or in any suitable order.

A protected attribute value is selected for analysis at 710. According to various embodiments, protected attribute values selected for analysis may include any values that may be assigned to the protected attribute within the test data set.

One or more attribute-level model performance metrics are determined at 712. According to various embodiments, the attribute-level performance metrics may include any or all of the model-level performance metrics discussed with respect to the operation 706. In this way, the predictive performance of the model for particular subsets of the data may be determined independently. Moreover, the predictive performance of the model for particular classes may be compared across different instances of the model. For example, the predictive performance of a model for women may be compared before and after adding a particular feature to the model. In such a configuration, the feature may be retained if it generally improves or at least does not harm the predictive performance of the model for values of a protected attribute. In addition, the feature would be retained if it improves fairness, such as reducing relative denial rates between groups, without a significant drop in a performance metric like accuracy.

A determination is made at 714 as to whether to select an additional protected attribute value for analysis. If no additional protected attribute value is selected for analysis, then at 716 a determination is made as to whether to select an additional protected attribute for analysis. As discussed with respect to the operations 708 and 710, any or all of the protected attributes and associated values may be analyzed to determine their contributions to model performance and/or any indications of bias related to the values.

FIG. 8 illustrates an example of a method 800 for applying a supervised machine learning model, performed in accordance with one or more embodiments. According to various embodiments, the method 800 may be used to determine one or more predicted outcome values based on a prediction model trained as described with respect to the method 400 shown in FIG. 4.

A request to apply a supervised machine learning model is received at 802. In some implementations, the request may be received at a computing device. The request may include or reference any or all of the information discussed in FIG. 8.

Inference data for the supervised machine learning model is identified at 804. In some implementations, the inference data may include one or more observations similar to those discussed with respect to the training data in FIG. 4. However, an inference observation may include a target value that is not observable.

A determination is made at 806 as to whether the inference data includes protected attribute values. The determination may be made by analyzing the features reflected in the observations within the inference data. If the inference data includes protected attribute values, then at 808 the inference data is updated to remove the protected attribute values.

In some embodiments, the operation 808 may involve entirely removing data values corresponding with the protected attribute. For instance, a sex or race parameter in a supervised machine learning model may be dropped entirely.

In some embodiments, the operation 808 may involve replacing data values corresponding with the protected attribute value with default values. For instance, all data values corresponding with gender may be set to either male or female.

In particular embodiments, the operation 808 may involve performing the same types of operations discussed with respect to operation 410 shown in FIG. 4. That is, if in the final trained model protected attribute values were dropped completely and treated as missing at 410, then the same may be done at operation 808. Similarly, if in the final trained model protected attributes were replaced with a single value for all observations, then the same may be done at operation 808.

A determination is made at 810 as to whether the inference data includes feature data values with insufficient overlap or have a positivity violation. According to various embodiments, the determination may involve analyzing the inference data to determine whether it includes combinations of feature values identified in FIG. 6 as having insufficient overlap or a positivity violation.

If it is determined that the inference data includes feature data values with insufficient overlap or a positivity violation, then at 812, the inference data is updated to remove the feature data values. According to various embodiments, the operation 812 may involve replacing feature data values having insufficient overlap with substitute values. In some embodiments, the substitute values may be determined as discussed with respect to the method 600 shown in FIG. 6.

At 814, one or more predicted target values are determined. According to various embodiments, the one or more predicted target values may be determined by applying the prediction model determined in FIG. 4 to the inference data identified at 804, updated as discussed with respect to the operations 808 and 812. Importantly, the original protected attribute values are not used to generate the predicted outcome values. If no substitute protected attribute values are determined, then the protected attribute values may be omitted entirely. Alternatively, if substitute protected attribute values are determined, then the substitute protected attribute values may be supplied to the supervised machine learning model instead of the original protected attribute values.

The predicted target values are stored at 816. According to various embodiments, the predicted outcome values may be stored on any suitable storage device.

Figure 9:
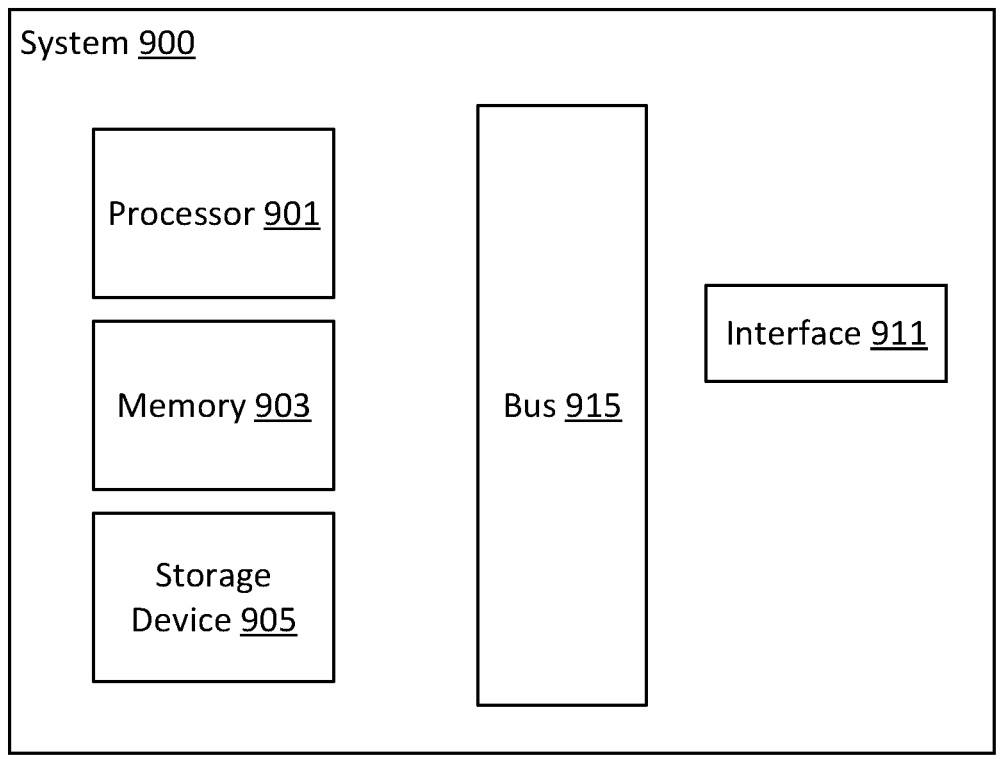
FIG. 9 illustrates one example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as a variety of devices such as computing device configured to perform data analysis, a cloud computing system configured to perform data analysis, or any other device or service described herein. Although a particular configuration is described, a variety of alternative configurations are possible. The processor 901 may perform operations such as those described herein (this could include CPUs, GPUs, TPUs, or some combination, for example). Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method of training and applying a prediction model comprising:
   determining a trained prediction model by training a prediction model based on training data including a plurality of training observations, each of the plurality of training observations including a respective plurality of training data values corresponding with a plurality of features, each of the plurality of training observations also including a respective target value, each of the plurality of training observations also including a respective protected attribute value corresponding with a protected attribute feature selected from the group consisting of: race, ethnicity, sex, gender, national origin, religion, disability status, age, genetic information, marital status, and receipt of public assistance, wherein determining the trained prediction model includes:
      determining one or more default protected attribute values for the prediction model,
      determining an overlap profile between the protected attribute feature and a designated feature of the plurality of features, the overlap profile indicating a respective degree of overlap among the plurality of training observations between first selected values corresponding to the protected attribute feature and second selected values corresponding to the designated feature,
      determining based on the overlap profile that a designated one of the respective degrees of overlap indicates a positivity violation, and
      identifying one or more value replacement rules for correcting the positivity violation by replacing a feature value;
   receiving via a communication interface a request to determine a designated predicted target value for a designated inference observation after determining the one or more default protected attribute values, the designated inference observation including a designated plurality of inference data values corresponding with the plurality of features;
   updating the designated inference observation in memory to include a replacement data value determined based on the one or more value replacement rules and a designated default protected attribute value of the one or more default protected attribute values;
   determining the designated predicted target value via a processor by applying the prediction model to the updated designated inference observation including the replacement data value and the designated default protected attribute value; and
   storing the predicted target value on a storage device.

2. The method recited in claim 1, the method further comprising:
   determining via the processor a plurality of predicted target values including the designated predicted target value by applying the prediction model to the designated default protected attribute value and a plurality of inference observations including the designated inference observation, each of the plurality of inference observations including a respective plurality of inference data values corresponding with the plurality of features.

3. The method recited in claim 1, wherein the prediction model is a regression model that includes a plurality of regression coefficients corresponding with the plurality of features, a designated one or more of the plurality of regression coefficients corresponding with the protected attribute feature, wherein applying the prediction model to the inference observation involves determining a constant term based on the designated default protected attribute value and the designated one or more regression coefficients.

4. The method recited in claim 1, wherein the prediction model is a neural network that includes a plurality of neurons corresponding with the plurality of features, a designated one of the plurality of neurons corresponding with the protected attribute feature, wherein applying the prediction model to the inference observation involves determining a constant value for the designated neuron based on the designated default protected attribute value.

5. The method recited in claim 1, wherein the prediction model is selected from the group consisting of: a tree-based model, a neural network model, and a gradient boosting model.

6. The method recited in claim 1, the method further comprising:
   identifying one or more features of the plurality of features that lack a causal effect on the target value; and
   removing the one or more features from the plurality of features.

7. The method recited in claim 6, wherein the one or more features have low predictive power but are highly correlated with the protected attribute values.

8. The method recited in claim 1, wherein determining the trained prediction model comprises performing a backdoor adjustment to prevent one or more of the plurality of features from acting as a proxy for the protected attribute values.

9. The method recited in claim 1, wherein the predicted target value reflects a causal relationship between the plurality of inference data values and the predicted target value while excluding one or more correlations between the protected attribute feature and the predicted target value.

10. One or more non-transitory computer-readable media having instructions stored thereon for performing a method of training and applying a prediction model, the method comprising:

determining a trained prediction model by training a prediction model based on training data including a plurality of training observations, each of the plurality of training observations including a respective plurality of training data values corresponding with a plurality of features, each of the plurality of training observations also including a respective target value, each of the plurality of training observations also including a respective protected attribute value corresponding with a protected attribute feature selected from the group consisting of: race, ethnicity, sex, gender, national origin, religion, disability status, age, genetic information, marital status, and receipt of public assistance, wherein determining the trained prediction model includes:

determining one or more default protected attribute values for the prediction model, determining an overlap profile between the protected attribute feature and a designated feature of the plurality of features, the overlap profile indicating a respective degree of overlap among the plurality of training observations between first selected values corresponding to the protected attribute feature and second selected values corresponding to the designated feature, determining based on the overlap profile that a designated one of the respective degrees of overlap indicates a positivity violation, and identifying one or more value replacement rules for correcting the positivity violation by replacing a feature value;

receiving via a communication interface a request to determine a designated predicted target value for a designated inference observation after determining the one or more default protected attribute values, the designated inference observation including a designated plurality of inference data values corresponding with the plurality of features;

updating the designated inference observation in memory to include a replacement data value determined based on the one or more value replacement rules and a designated default protected attribute value of the one or more default protected attribute values;

determining the designated predicted target value via a processor by applying the prediction model to the updated designated inference observation including the replacement data value and the designated default protected attribute value; and storing the predicted target value on a storage device.

11. The one or more non-transitory computer-readable media recited in claim 10, the method further comprising:

determining via the processor a plurality of predicted target values including the designated predicted target value by applying the prediction model to the designated default protected attribute value and a plurality of inference observations including the designated inference observation, each of the plurality of inference observations including a respective plurality of inference data values corresponding with the plurality of features.

12. The one or more non-transitory computer-readable media recited in claim 10, the method further comprising:

determining a plurality of evaluation metric values indicating performance of the prediction model for each of a plurality of candidate default protected attribute values, wherein the one or more default protected attribute values are determined at least in part based on the plurality of evaluation metrics.

13. The one or more non-transitory computer-readable media recited in claim 10, wherein the prediction model is a regression model that includes a plurality of regression coefficients corresponding with the plurality of features, a designated one or more of the plurality of regression coefficients corresponding with the protected attribute feature, wherein applying the prediction model to the inference observation involves determining a constant term based on the designated default protected attribute value and the designated one or more regression coefficients.

14. The one or more non-transitory computer-readable media recited in claim 10, wherein the prediction model is a neural network that includes a plurality of neurons corresponding with the plurality of features, a designated one of the plurality of neurons corresponding with the protected attribute feature, wherein applying the prediction model to the inference observation involves determining a constant value for the designated neuron based on the designated default protected attribute value.

15. A computing system including a processor, memory, and a communication interface, the computing system configured to perform a method of training and applying a prediction model comprising:

determining a trained prediction model by training a prediction model based on training data including a plurality of training observations, each of the plurality of training observations including a respective plurality of training data values corresponding with a plurality of features, each of the plurality of training observations also including a respective target value, each of the plurality of training observations also including a respective protected attribute value corresponding with a protected attribute feature selected from the group consisting of: race, ethnicity, sex, gender, national origin, religion, disability status, age, genetic information, marital status, and receipt of public assistance, wherein determining the trained prediction model includes:

determining one or more default protected attribute values for the prediction model, determining an overlap profile between the protected attribute feature and a designated feature of the plurality of features, the overlap profile indicating a respective degree of overlap among the plurality of training observations between first selected values corresponding to the protected attribute feature and second selected values corresponding to the designated feature, determining based on the overlap profile that a designated one of the respective degrees of overlap indicates a positivity violation, and identifying one or more value replacement rules for correcting the positivity violation by replacing a feature value;

receiving via a communication interface a request to determine a designated predicted target value for a designated inference observation after determining the one or more default protected attribute values, the designated inference observation including a designated plurality of inference data values corresponding with the plurality of features;

updating the designated inference observation in memory to include a replacement data value determined based on the one or more value replacement rules and a designated default protected attribute value of the one or more default protected attribute values;

determining the designated predicted target value via a processor by applying the prediction model to the updated designated inference observation including the replacement data value and the designated default protected attribute value; and storing the predicted target value on a storage device.

16. The computing system recited in claim 15, wherein the processor is operable to determine a plurality of predicted target values including the designated predicted target value by applying the prediction model to the designated default protected attribute value and a plurality of inference observations including the designated inference observation, each of the plurality of inference observations including a respective plurality of inference data values corresponding with the plurality of features.

17. The computing system recited in claim 15, wherein the processor is operable to determine a plurality of evaluation metric values indicating performance of the prediction model for each of a plurality of candidate default protected attribute values, wherein the one or more default protected attribute values are determined at least in part based on the plurality of evaluation metrics.

18. The computing system recited in claim 15, wherein the prediction model is a regression model that includes a plurality of regression coefficients corresponding with the plurality of features, a designated one or more of the plurality of regression coefficients corresponding with the protected attribute feature, wherein applying the prediction model to the inference observation involves determining a constant term based on the designated default protected attribute value and the designated one or more regression coefficients.

19. The computing system recited in claim 15, wherein the prediction model is a neural network that includes a plurality of neurons corresponding with the plurality of features, a designated one of the plurality of neurons corresponding with the protected attribute feature, wherein applying the prediction model to the inference observation involves determining a constant value for the designated neuron based on the designated default protected attribute value.

* * * * *